W. P. McKINSTRY.
Children's Carriage.
No. 21,353. Patented Aug. 31, 1858.
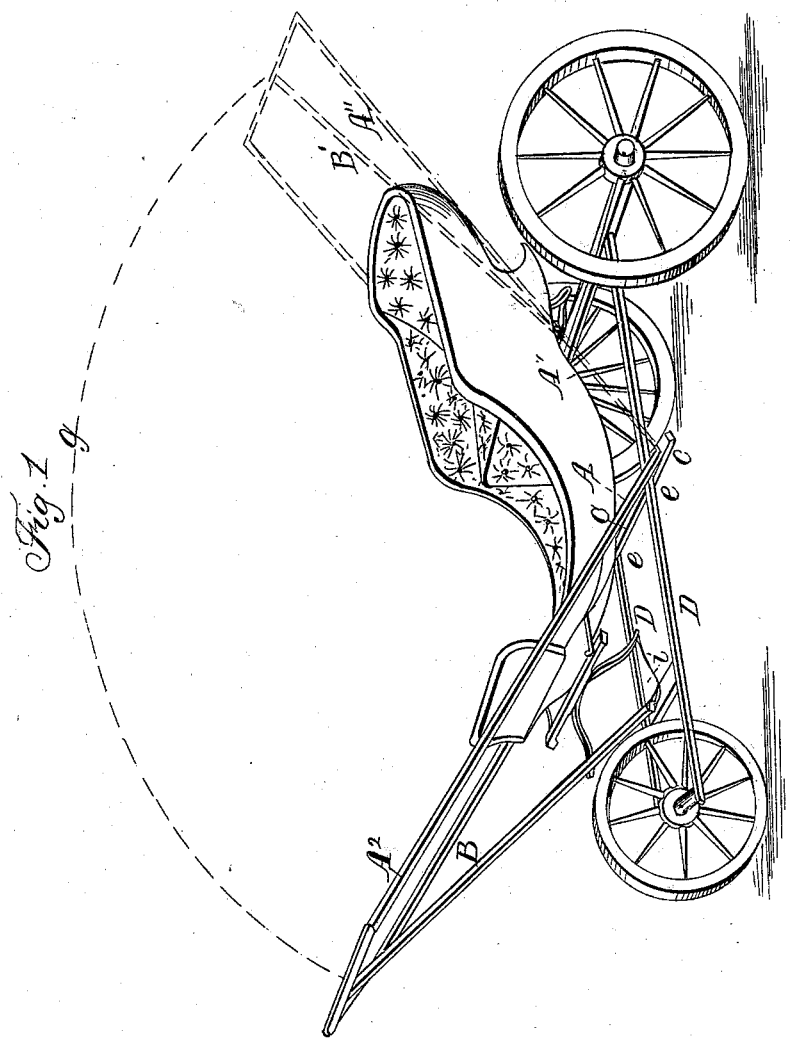
Witnesses:
James P McLean
David Crowther
Inventor.
Wm P McKinstry

UNITED STATES PATENT OFFICE.

WILLIAM P. McKINSTRY, OF NEW YORK, N. Y.

CHILD'S CARRIAGE.

Specification of Letters Patent No. 21,353, dated August 31, 1858.

*To all whom it may concern:*

Be it known that I, WILLIAM P. McKINSTRY, of New York city, in the county and State of New York, have made certain novel and useful Improvements in Attaching the Draft-Bars to Children's Carriages; and I hereby declare the following to be a full, clear, and exact description thereof, reference being had to the accompanying drawings, which drawings are lettered to correspond with and constitute a part of the specification.

To enable others skilled in the art of manufacture to construct and use my invention I will describe it as follows:

Plate 1, is a perspective view of a child's carriage having three wheels and having my improvement attached ready for drawing as shown at letters (A, A², and B.) The handles or draft bars (A, A²) are attached to a roller (C, C,) which runs transversely under the running gear or connecting bars (D, D,) to which it the roller is secured by means of two bands that serve as boxes for the roller to turn in when operated by the draft bars (A, A².) Letter B, is also a draft bar and serves as a brace to (A, A²,) when connected to the front or back end of the carriage by means of a small bolt or thumb screw as shown at (*i*). Take out the bolt or screw (*i*) and pass the handles (A²,) over the top of the carriage and through the arch (*g*). Then fasten the foot of the brace or draft bar (B¹,) to the hind axle of the carriage by means of a bolt or screw aforesaid. You are then prepared to shove instead of drawing the vehicle as indicated in the drawing by dotted lines.

There have been various inventions for either drawing or shoving children's carriages so that the occupant may always ride with his face in the direction the vehicle is going. Handles have been made to be changed from one end of the body of the carriage to the other end thereof. The body has also been constructed so that it could be turned for the purpose aforesaid. Therefore adjustable handles are not new.

The superiority of my mode of attaching the draft-bars or handles of a child's carriage is: First. I have a greater leverage and better control of the weight to be overcome (when the carriage is in the act of turning over) from the fact that I have a double purchase by means of the bars (A, A²,) at the middle and the brace (B,) at the end of the vehicle. Secondly. It is not necessary to remove the child when changing the handles from the front to the back end of the carriage as is the case with the most of those in common use.

Therefore what I claim as novel and what I wish to secure by Letters Patent of the United States is, The use of three draft bars or handles (A, A², and B,) attached to a child's carriage and operated substantially as described and shown in the drawings.

In testimony whereof I hereunto subscribe my name in the presence of two witnesses.

WM. P. McKINSTRY.

Witnesses:
 DAVID CROWTHER,
 JAMES P. McLEAN.